United States Patent [19]

Graber et al.

[11] Patent Number: 4,702,401

[45] Date of Patent: Oct. 27, 1987

[54] BICYCLE SUPPORT DEVICE

[75] Inventors: Joseph V. Graber, Middleton; Ervin L. Severson, Oregon, both of Wis.

[73] Assignee: Graber Products, Inc., Madison, Wis.

[21] Appl. No.: 7,606

[22] Filed: Jan. 28, 1987

[51] Int. Cl.[4] .............................................. B60R 9/04
[52] U.S. Cl. .............................. 224/42.03 B; 224/323; 224/324
[58] Field of Search ................. 224/42.03 B, 321, 323, 224/324, 329, 42.38; 211/5, 23, 24

[56] References Cited

U.S. PATENT DOCUMENTS

| 613,773 | 11/1898 | Neumann . | |
| 2,539,997 | 1/1951 | Graves | 224/324 X |
| 3,176,903 | 4/1965 | Farley | 224/42.03 B |
| 3,251,519 | 5/1966 | Jones | 224/323 X |
| 3,367,548 | 2/1968 | Cooper | 224/42.03 B |
| 3,591,029 | 7/1971 | Coffey | 224/42.03 B X |
| 3,675,833 | 7/1972 | Barr | 224/42.03 B X |
| 3,901,421 | 8/1975 | Kalicki et al. . | |
| 3,993,229 | 11/1976 | Summers | 224/42.03 B |
| 3,994,425 | 11/1976 | Graber . | |
| 4,126,228 | 11/1978 | Bala et al. . | |
| 4,345,705 | 8/1982 | Graber . | |
| 4,386,709 | 6/1983 | Graber . | |
| 4,452,384 | 6/1984 | Graber . | |
| 4,524,893 | 6/1985 | Cole | 224/42.03 B X |

FOREIGN PATENT DOCUMENTS

| 54263 | 1/1938 | Denmark | 224/42.03 B |
| 93810 | 12/1938 | Sweden | 224/42.03 B |
| 104714 | 7/1942 | Sweden | 224/42.03 B |

Primary Examiner—Henry J. Recla
Assistant Examiner—Robert Petrik
Attorney, Agent, or Firm—Vernon J. Pillote

[57] ABSTRACT

A bicycle support device including a channel for receiving the wheels of a bicycle and a bicycle frame engaging structure for supporting a bicycle in a plane generally bisecting the channel with the wheels resting in the channel. A toggle type wheel engaging clamp is mounted on the channel and arranged to engage a bicycle wheel at a location above the channel and is movable to a clamp position in which it draws the wheel in a direction having one component toward the channel to firmly press the wheel in the channel and a second component lengthwise of the channel to aid in retaining the bicycle against movement longitudinally of the channel. The wheel engaging clamp is adjustable along the channel to accommodate different bicycles.

14 Claims, 6 Drawing Figures

BICYCLE SUPPORT DEVICE

BACKGROUND

Bicycle support devices have heretofore been made, for example as disclosed in U.S. Pat. Nos. 613,773; 3,901,421; 3,994,425; 4,126,228; 4,345,705; 4,386,709 and 4,452,384, for mounting a bicycle on a vehicle or for storing bicycles, and which included a wheel receiving channel and a bicycle frame engaging means for supporting the bicycle with its wheels resting in the channel. U.S. Pat. No. 613,773 discloses resilient tire engaging clips for retaining the tire in the channel and U.S. Pat. No. 4,126,228 discloses latches that extend crosswise of the open side of the channel to retain the wheel in the channel. Other patents such as U.S. Pat. No. 4,386,709 provide straps that can be wrapped around the channel and over the rim of the bicycle to retain the wheel in the channel. U.S. Pat. No. 4,416,379 discloses a bicycle storage device having a wheel engaging hook that is mounted on one end of the channel to extend crosswise of a plane bisecting the channel at a location spaced from the open side of the channel so that the bicycle wheel can be moved laterally of the channel past the free hook and shifted into the channel until both wheels rest in the channel with the weight of the bicycle supported by the hook.

The front wheels of bicycles are mounted for steering movement about a generally upright fork axis and, when bicycle support devices are mounted on a vehicle, the front wheel tends to oscillate and vibrate about the fork axis in the wind currents encountered at highway speeds. The prior wheel retainers that engaged the wheels at the location where they engage the channel, did prevent the wheels from moving out of the channel but were not effective to firmly retain the wheel and bicycle against oscillation and vibration.

It is an object of the present invention to provide a bicycle support device that will support a bicycle with wheels resting in a channel in a manner to inhibit oscillation and vibration of the bicycle and wheels in the channel.

Another object of this invention is to provide a bicycle support device in which a bicycle can be quickly mounted and removed from the support device.

Accordingly, the present invention provides a bicycle support device including a channel for receiving the wheels of a bicycle and a frame engaging means for supporting a bicycle with the wheels at a preselected location in the channel, and a toggle clamp means adapted to engage a wheel of the bicycle for drawing the wheel firmly into the channel and for also drawing the wheel in a direction lengthwise of the channel to inhibit movement of the bicycle and wheel relative to the channel. The toggle wheel clamp means includes a bracket mounted on the channel for adjustment therealong to a position spaced from one of the wheels of the bicycle, a lever pivotally mounted intermediate its ends on the bracket for movement about a lever axis crosswise of the longitudinal medial plane of the channel, and a wheel engaging hook and shank means connecting the wheel engaging hook to one end of the lever for a relative pivotal movement about a second pivot axis paralleling the lever pivot axis. The wheel engaging hook extends crosswise of the longitudinal medial plane of the channel and the hook is swingable relative to the lever to a position in which the hook is offset from the open side of the channel to engage a bicycle wheel at a location spaced from a plane through the open side of the channel, and the lever is pivotally movable about the lever axis between a clamp position in which the lever draws the wheel engaging hook in a direction inclined at an acute angle to the channel to a preselected position relative to the bracket, and a release position in which the hook is spaced from the bracket a distance greater than the preselected distance. The toggle wheel clamp means draws the wheel firmly into the channel and also exerts a force on the wheel in a direction lengthwise of the channel, to aid in holding the bicycle against movement in a direction lengthwise of the channel.

The bicycle support device of the present invention is particularly adapted for use as a vehicle attached bicycle carrier, it being understood that the bicycle support device could be used as a bicycle display or storage device, if desired. The bicycle support device generally includes one or more elongated wheel receiving channels 10, one for each bicycle, a bicycle frame engaging means 11 for supporting the frame F of a bicycle in a longitudinal medial plane generally bisecting the channel and with the bicycle wheels Wf and Wr at a preselected location along the channel, and a wheel clamp means 12 adapted to engage one of wheels Wf of a bicycle at a location above the channel. The wheel engaging channels are mounted on a support such as cross-frame members 13, 13'. When the bicycle support device is used as a vehicle attached carrier, the frame members 13, 13' can be supported on the vehicle roof or rear deck lid by a conventional vehicle engaging bracket shown at 14, 14' having hooks (not shown) adapted to engage the edge of a roof or deck lid. Various different roof engaging brackets and hook arrangements of known construction can be used to attach the carrier to a vehicle and further detailed description of the roof engaging brackets is deemed unnecessary.

Figure 1:
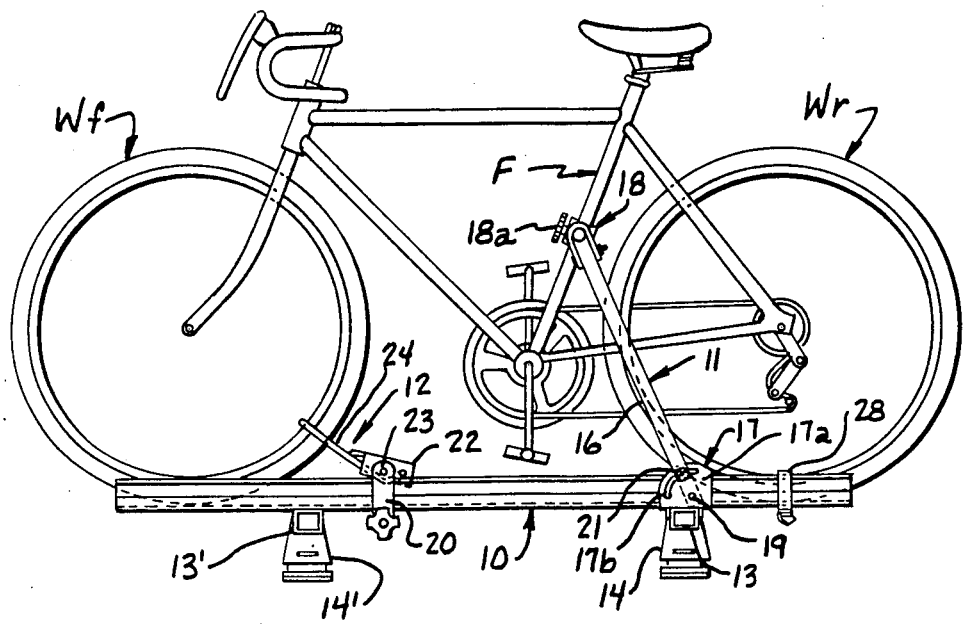
FIG. 1 is a side elevational view of the bicycle support device illustrating a bicycle mounted therein.

The frame engaging means 11 for supporting the bicycle in a longitudinal medial plane generally bisecting the wheel receiving channel can be of known construction, for example as shown in U.S. Pat. Nos. 3,901,421; 4,345,705 and 4,452,384. The frame engaging means is preferably of the foldable type and, as shown in FIG. 1, includes an elongated support member 16 that is mounted at its lower end on a bracket 17 at a location offset from one side of the channel, and which has laterally extending bicycle frame engaging means 18 at its upper end. The bracket 17 is secured at a fixed location along the channel. For this purpose, the bracket 17 and wheel engaging channel 10 can be separately secured to one of the cross-frame members 13 or, alternatively, the bracket and wheel receiving channel can be secured to a common mounting plate which is attached as by U-bolts, to one of the cross-frame members 13. The lower end of the member 16 is pivotally mounted for movement about a pivot pin 19 relative to the bracket between a lower folded position and a raised support position shown in FIG. 1. The bracket has spaced side plates 17a disposed along opposite sides of the member 16 and an arcuate slot 17b concentric with the pivot pin 19, and a means such as bolt 21 extends through the arcuate slots and through an opening in the member 16 and has a manually operable knob or nut 18a provided on one end adapted to hold the member 16 in its raised support position when the knob is tightened. The bicycle frame engaging means 18 can be of conventional construction and may, for example, include a pair of clamp jaws for clampingly engaging the frame member of the bicycle, as disclosed in U.S. Pat. No. 3,901,421, or a "J" bolt such as disclosed in U.S. Pat. Nos. 4,345,705 and 4,452,384.

Figure 3:
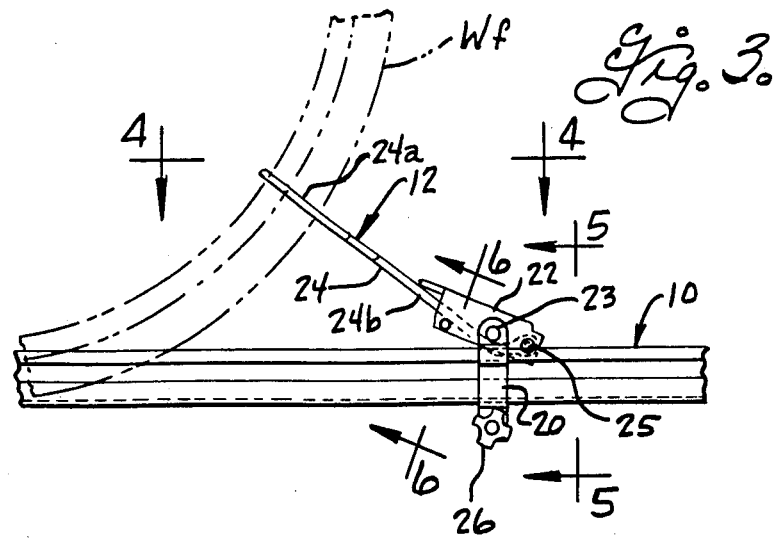
FIG. 3 is a fragmentary side elevational view of the bicycle support device illustrating the wheel clamp in a clamp condition.
Figure 4:
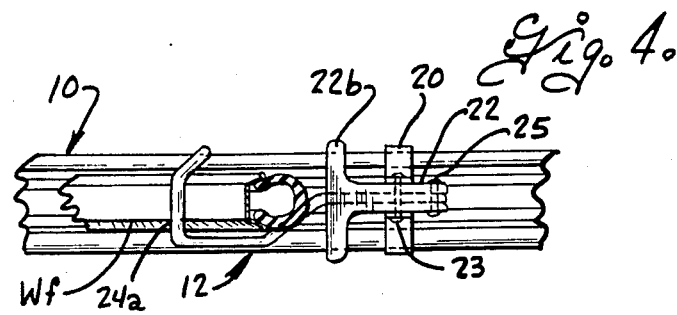
FIG. 4 is a fragmentary horizontal sectional view taken on the plane 4—4 of FIG. 3.
Figure 5:
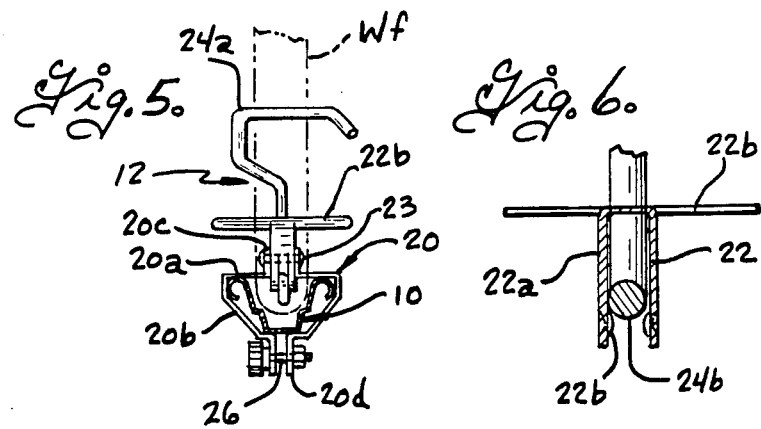
FIG. 5 is a fragmentary vertical sectional view taken on the plane 5—5 of FIG. 3.
Figure 6:
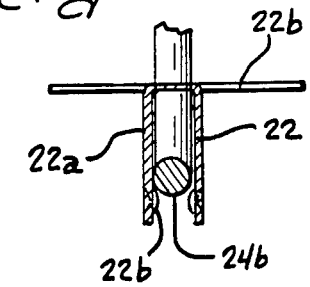
FIG. 6 is a fragmentary sectional view taken on the plane 6—6 of FIG. 3 and illustrating parts on a larger scale than FIG. 3.

The wheel engaging channel 10 preferably has relatively divergent side walls as best shown in FIG. 5 to accommodate bicycle tires of different balloon size. The wheel engaging clamp means 12 is arranged to engage one of the bicycle wheels and preferably the front bicycle wheel Wf as shown in FIG. 1 at a location spaced from the open side of the channel, and to apply a force to the wheel in a direction having one component extending downwardly toward the channel to draw the wheel firmly into the channel, and a second component extending lengthwise of the channel to aid in holding the bicycle against movement in a direction lengthwise of the channel. The wheel engaging clamp 12 includes a bracket 20 mounted on the wheel engaging channel, a lever 22 pivotally mounted intermediate its ends on the bracket for movement about a lever pivot means 23 that extends crosswise the longitudinal medial plane of the channel adjacent the open top of the channel, a wheel engaging member 24 having a hook 24a at one end and a shank 24b extending from one end of the hook, and means 25 pivotally connecting the end of the shank remote from the hook to one end of the lever for relatively pivotal movement about a second pivot axis paralleling the lever pivot axis. The bracket 20 is mounted for adjustment along the length of the channel so that it can be adjusted relative to the frame engaging means to accommodate bicycles of different size and style. In the preferred embodiment illustrated, the bracket 20 is formed by two generally U-shaped members disposed in an opposed relation and each having a portion 20a that overlies the upper edge of the wheel receiving channel, and portions 20b that extend downwardly alongside the outer sides of the wheel receiving channel. The bracket members each have an upwardly extending ear 20c that are interconnected by the lever pivot means 23 such as a rivet, and downwardly extending ears 20d at a level below the underside of the track that are adjustably interconnected by a bolt and thumb nut or knob 26. The bolt and thumb nut can be loosened to allow the bracket to be adjusted along the wheel receiving channel and tightened to retain the bracket in a selected adjusted position therealong. The lever 22 is pivotally mounted intermediate its ends on the lever pivot means 23 and the lever is preferably formed with a U-shaped cross-section with spaced leg portions 22a and a transversely extending handle portion 22b at one end. The hook 24a and shank 24b of the wheel engaging member 24 are preferably formed in one piece and may, for example, be formed of a piece of rod. The end of the shank portion remote from the hook is pivotally connected by the pivot means 25 to the lever 22 with the shank portion disposed between the leg portion 22a of the lever. The shank portion may, for example, be flattened at one end to provide an enlarged portion that is apertured to receive the pivot means 25. The shank 24b of the wheel engaging member is preferably disposed adjacent the longitudinal medial plane of the channel and the hook portion is formed as best shown in FIGS. 4 and 5 to extend laterally from the shank to one side of the longitudinal medial plane and then crosswise of the longitudinal medial plane to terminate with its free end adjacent the other side of the longitudinal medial plane. The pivotal connection of the wheel engaging member 24 to the lever 22 is preferably made sufficiently loose to allow limited movement of the hook engaging member in a direction crosswise of the longitudinal medial plane when the lever is in its release condition shown in FIG. 2, so that the hook member can be moved laterally to one side of the longitudinal plane of the channel to pass around the rim of the wheel and then crosswise of the longitudinal plane to extend crosswise of the bicycle wheel into engagement with the inner side of the rim of the wheel. When the lever is moved from its release position shown in FIG. 2 to its clamp position shown in FIGS. 3–5, the lever draws the hook portion of the wheel engaging member in a direction having one component toward the wheel receiving channel 10 to draw the bicycle wheel firmly into the channel, and a second component extending longitudinally of the wheel receiving channel to inhibit endwise movement of the bicycle in the channel. When the lever 22 is in its clamp position, the handle 22b engages the shank 24b at a location spaced from the pivot means 25 and the lever pivot 23 is offset below a plane through the axis of pivot means 25 and the point where the handle engages the shank to provide an over-center or toggle type clamp. The legs 22a of the lever straddle the shank 24b when the lever is in its clamp position and detents 22b are advantageously provided on the legs 22a of the lever at a location to engage the underside of the shank as shown in FIG. 6 to aid in releasably retaining the lever in its clamp position.

The wheel engaging clamp 12 is preferably located in the channel intermediate the wheels of the bicycle when the latter is supported by the frame engaging means 11 in the wheel receiving channel, so that the clamp draws the bicycle in the direction toward the frame engaging means 11. In the foldable frame engaging means as disclosed, the member 11 is movable from a folded condition alongside the channel to a raised condition and movement of the frame engaging member to its raised position is limited when the bolt 21 engages the upper end of the slots 17b. When the wheel engaging clamp is moved to its clamp position, it draws the bicycle in a direction to urge the bicycle toward the frame engaging means and thereby aid in retaining the frame engaging means to its fully raised position. A means such as a strap 35 is advantageously provided to engage the other wheel such as the rear wheel Wr of the bicycle, to retain the rear wheel in the channel.

Figure 2:
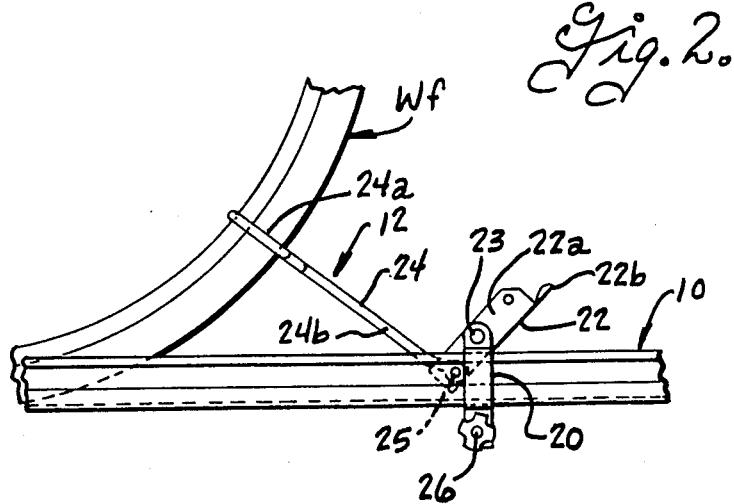
FIG. 2 is a fragmentary side elevational view of the bicycle support device illustrating the wheel clamp in a release condition.

From the foregoing it is felt that the construction and operation of the bicycle support device will be readily understood. The frame engaging means 11 supports the bicycle in a longitudinal plane generally bisecting the wheel receiving channel and the clamp 12 is a toggle type clamp that is movable between a release position as shown in FIG. 2 and a clamp position as shown in FIGS. 3-5. The bracket 21 of the wheel engaging clamp is adjustable along the wheel receiving channel to a position in which the hook on the wheel engaging member can be moved laterally into a position loosely engaging the rim of the front wheel of the bicycle. When the lever is moved to its clamp position, it draws the hook in a direction having one component toward the wheel receiving channel to draw the bicycle wheel firmly into the wheel receiving channel, and a second component extending longitudinally of the channel to aid in holding the bicycle against longitudinal movement. When used with a foldable frame engaging means, the wheel engaging clamp is advantageously arranged to draw the bicycle in a direction to aid in retaining the foldable frame engaging member in its raised position. The wheel engaging clamp engages the wheel of the bicycle at a level above the wheel receiving channel and stabilizes the wheel against oscillation. The wheel engaging clamp is easily and quickly movable between a clamp and a release condition to facilitate removal and installation of the bicycle on the support device.

The embodiments of the invention in which an exclusive property or privilege is claimed are defined as follows:

1. A bicycle support device comprising a channel having an open side for receiving the wheels of a bicycle; bicycle frame engaging means for supporting the frame of a bicycle in a longitudinal medial plane generally bisecting the channel with the bicycle wheels at a preselected location, toggle wheel clamp means adapted to engage a wheel of the bicycle for drawing the wheel in a direction having one component toward the channel and a second component lengthwise of the channel, the wheel clamp means including (a) a bracket mounted on the channel for adjustment therealong to a position spaced from one of the wheels of the bicycle, (b) a lever pivotally mounted intermediate its ends on said bracket for movement about a lever axis crosswise of said longitudinal medial plane of the channel, (c) a wheel engaging hook, (d) shank means connecting the wheel engaging hook to one end of the lever for relative pivotal movement about a second pivot axis paralleling said lever pivot axis, the wheel engaging hook extending crosswise of said longitudinal medial plane of the channel, the wheel engaging hook being swingable relative to said lever to a position in which the hook is offset from the open side of the channel to engage a bicycle wheel at a location spaced from a plane through the open side of the channel, the lever being pivotally movable about said lever axis between a clamp position in which the lever draws the wheel engaging hook in a direction inclined at an acute angle to the channel to a preselected position relative to the bracket and a release position in which the hook is spaced from the bracket a distance greater than said preselected distance.

2. A bicycle support device according to claim 1 wherein said wheel engaging hook is movable in a direction crosswise of the channel into and out of engagement with the rim of a bicycle wheel when the lever is in its release position.

3. A bicycle support device according to claim 1 wherein said lever and said shank means are constructed and arranged as a toggle clamp to lock the lever in said clamp position.

4. A bicycle support device according to claim 1 including means for releasably retaining said lever in said clamp position.

5. A bicycle support device according to claim 1 wherein said bracket overlies the open side of the channel and has first and second side portions extending along opposite sides of the channel, and means adjustably interconnecting said first and second side portions to clamp the bracket to the channel.

6. A bicycle support device according to claim 1 wherein said shank means is disposed substantially in said longitudinal medial plane of the channel.

7. A bicycle support device according to claim 1 wherein the means for supporting the front of a bicycle includes an arm pivotally mounted at a location spaced along the channel from the wheel clamp means for swinging movement in a plane along one side of the channel between a folded position extending generally lengthwise of the channel and a raised position, and frame clamp means on said arm for gripping a frame member of a bicycle.

8. A bicycle support device comprising a channel having an open side for receiving a wheel of a bicycle, means for supporting a bicycle in a longitudinal medial plane generally bisecting the channel when the bicycle wheel is resting in the channel, a wheel clamp for clamping the wheel of the bicycle to the channel, the wheel clamp including (a) a bracket mounted on the channel for adjustment therealong, (b) a lever pivotally mounted intermediate its ends on the said bracket for movement about a lever axis crosswise of the longitudinal medial plane adjacent the open top of the channel, (c) a wheel engaging member having an elongated shank and a wheel engaging hook at one end of the shank, and (d) means pivotally connecting the end of the shank remote from the hook to one end of the lever for relative pivotal movement about a second pivot axis paralleling said lever pivot axis, the hook of the wheel engaging member extending crosswise of said longitudinal medial plane adjacent the open side of the channel, able relative to said lever to a position in which the hook is offset from the open side of the channel to engage the bicycle wheel at a location spaced from a plane through the open side of the channel, the lever being pivotally movable about said lever axis between a clamp position in which the lever draws the wheel engaging hook to a preselected position relative to the bracket and a release position in which the hook is spaced from the bracket a distance greater than said preselected distance, said lever and shank being constructed and arranged as a toggle clamp to lock the lever in the clamp position.

9. A bicycle support device according to claim 8 wherein said bracket is slidably adjustable along the channel, and means for selectively locking said bracket in adjusted positions along the channel.

10. A bicycle support device according to claim 8 wherein said bracket overlies the open side of the channel and has first and second side portions extending along opposite sides of the channel, and means adjustably interconnecting said first and second side portions at a location below the channel to retain the bracket in adjusted positions along the channel.

11. A bicycle support device according to claim 8 wherein said shank means is disposed substantially in said longitudinal medial plane of the channel.

12. A bicycle support according to claim 8 wherein means for supporting a bicycle includes an arm pivotally mounted at a location spaced along the channel from the wheel clamp for swinging movement in a plane along one side of the channel between a folded position extending generally lengthwise of the channel and a raised position, and frame clamp means on said arm for gripping a frame member of a bicycle.

13. A bicycle support device according to claim 8 wherein said lever has a U-shaped cross-section with leg portions spaced apart to receive the shank of the wheel engaging member when the lever is in said clamp position.

14. A bicycle support device according to claim 13 including detent means on the leg portions of said lever engageable with said shank for releasably retaining said lever in said clamp position.

* * * * *

UNITED STATES PATENT AND TRADEMARK OFFICE
CERTIFICATE OF CORRECTION

PATENT NO. : 4,702,401
DATED : October 27, 1987
INVENTOR(S) : Joseph V. Graber et al It is certified that error appears in the above-identified patent and that said Letters Patent are hereby corrected as shown below:

Claim 8, column 6, line 32, "top" should be -- side --;

Claim 8, column 6, line 40, delete "medial";

Claim 8, column 6, lines 40 and 41, delete "adjacent the open side of the channel, able" and insert -- and the wheel engaging member being swingable --.

Signed and Sealed this

Twenty-ninth Day of March, 1988

*Attest:*

DONALD J. QUIGG

*Attesting Officer*      *Commissioner of Patents and Trademarks*